United States Patent [19]

Bryniarski et al.

[11] Patent Number: 4,895,611

[45] Date of Patent: * Jan. 23, 1990

[54] METHOD AND APPARATUS FOR MAKING NON-ROPING THERMOPLASTIC DRAW TAPE FOR THERMPLASTIC BAGS

[75] Inventors: David A. Bryniarski, Rochester; Edward G. Grosz, Sodus Point, both of N.Y.

[73] Assignee: Mobil Oil Corporation, New York, N.Y.

[*] Notice: The portion of the term of this patent subsequent to Apr. 18, 2006 has been disclaimed.

[21] Appl. No.: 312,281

[22] Filed: Feb. 21, 1989

Related U.S. Application Data

[63] Continuation-in-part of Ser. No. 157,751, Feb. 19, 1988, Pat. No. 4,822,437.

[51] Int. Cl.⁴ .................... B32B 31/18; B32B 31/20; B32B 35/00
[52] U.S. Cl. .................... 156/252; 156/265; 156/302; 156/307.3; 156/497; 156/519; 156/552; 156/555; 156/578; 156/583.1; 383/75; 493/225; 493/226; 493/928
[58] Field of Search ............ 156/252, 265, 302, 307.3, 156/497, 519, 552, 555, 568, 578, 583.1; 383/75; 493/225, 226, 928

[56] References Cited

U.S. PATENT DOCUMENTS

| | | | |
|---|---|---|---|
| 2,958,365 | 11/1960 | Molins et al. | 156/519 |
| 3,029,853 | 4/1962 | Piazzi | 383/75 |
| 3,616,042 | 10/1971 | Beyer et al. | 156/516 |
| 3,909,330 | 9/1975 | Schmermund | 156/252 |
| 4,165,832 | 8/1979 | Kuklies et al. | 383/8 |
| 4,360,398 | 11/1982 | Sabee | 156/522 |
| 4,397,704 | 8/1983 | Frick | 156/519 |
| 4,558,463 | 12/1985 | Boyd | 383/75 |
| 4,597,750 | 7/1986 | Boyd et al. | 493/346 |
| 4,617,008 | 10/1986 | Boyd et al. | 493/248 |
| 4,624,654 | 11/1986 | Boyd et al. | 493/194 |
| 4,628,536 | 12/1986 | Herrington | 383/75 |
| 4,746,391 | 5/1988 | Heyse et al. | 156/555 |

FOREIGN PATENT DOCUMENTS

1125363 8/1968 United Kingdom .

Primary Examiner—Michael Wityshyn
Attorney, Agent, or Firm—Alexander J. McKillop; Charles J. Speciale

[57] ABSTRACT

Method and apparatus for the manufacture of non-roping thermoplastic draw tape handles for insertion into thermoplastic bags and in particular for the continuous application of an adhesive coated reinforcing layer of material to the handled portion of the thermoplastic draw tape to reduce roping.

6 Claims, 3 Drawing Sheets

METHOD AND APPARATUS FOR MAKING NON-ROPING THERMOPLASTIC DRAW TAPE FOR THERMPLASTIC BAGS

This is a continuation-in-part of parent application Ser. No. 157,751 filed Feb. 19, 1988.

FIELD OF THE INVENTION

The present invention relates to the manufacture of non-roping thermoplastic draw tape handles for insertion into thermoplastic bags, and in particular to a method and apparatus for the continuous application of a reinforcing layer of material to the handled portion of a draw tape to reduce "roping". The term "roping" refers to the tendency to form a round cross-section with a small diameter across the palm of the hand of the carrier in low gauge/high strength thermoplastic draw tapes while the bag is under load.

BACKGROUND OF THE INVENTION

Bags made of thin polethylene material have been used in various sizes. Small bags are used in packaging of sandwiches and the like. Larger bags are used as shopping bags. Even larger bags are used for containing trash.

A particularly advantageous closure for such a bag includes a draw tape made from the same polyethylene material as the bag. U.S. Pat. No. 3,029,853—Piazzi, British Patent 1,125,363 Jortikka, U.S. Pat. No. 4,558,463—Boyd and U.S. Pat. No. 4,624,654 Boyd et al are examples of draw tape bags. Such closures have been successfully employed in these bags.

Draw tape closures for large trash bags, and the manufacture of these draw tape trash bags, are described in the aforesaid related U.S. Pat. Nos. 4,558,463 and 4,624,654. Other related patents are U.S. Pat. No. 4,617,008—Boyd et al which describes a hem forming apparatus and U.S. Pat. No. 4,597,750—Boyd et al which describes apparatus for inserting a draw tape into the bag. Bags having intermittently oriented draw tapes are disclosed in related U.S. Pat. No. 4,628,536—Herrington. The disclosure of the foregoing related patents are incorporated herein by reference.

In the past, thermoplastic bag structures with integral handle elements formed as an integral part of the bag structure itself have been produced by a method which reduces stress concentration. Stress points around the bag mouth are distributed to areas which are less likely to rupture as a result of stress concentration. See U.S. Pat. No. 4,165,832—Kuklies et al. This patent discloses a thermoplastic bag structure with integral handle elements, i.e. the handles are actually an extension of the bag proper and stress relief notches are positioned at opposite ends of the mouth. This patent also discusses the effect of "roping" while the bag is under load. Another technique that has been employed in the past in connection with integral handles of thermoplastic bag is to place patches of additional thermoplastic material around the handle openings. These patches are heat sealed or spot welded to the handle portions.

Draw tape bags have a draw tape that is a separate structure from the bag proper. Draw tape trash bags of the type made according to the above-mentioned Boyd et al patents normally have a 1" wide draw tape for the full width of the bag. When the tape is pulled hard to close the bag, it elongates over most of its length, and the area where it is gripped by the hand becomes narrow, or "ropes" and hurts the hand. It is possible to make a draw tape that is sufficiently strong at thin gauges, such as 1.5 mils, but this tape is unsatisfactory for use because of the "roping" effect. As a result, it has been customary to use a tape material that is thicker, thus more costly then that which is required for performance. For example, tape thicknesses that have been used are in the order of 3 to 4 mills, about twice what is actually required It is desirable to produce a thermoplastic bag handle of a smaller gauge, less costly material, while substantially preventing "roping" at the area of the handle held by the hand of the carrier.

The following related patent applications disclose draw tape configurations for draw tape bags especially designed to reduce "roping" at the hand area while the draw tape bag is under load.

RELATED APPLICATIONS:

"Ribbed Draw Tape for Thermoplastic Bag", Edward M. Bullard, Ser. No. 71,296, filed July 9, 1987 now U.S. Pat. No. 4,762,430 issued Aug. 9, 1988 describes a draw tape for a trash bag having transverse or angular ribs which reduce roping of the draw tape when lifting a loaded bag. "Variable-Width Draw Tape for Thermoplastic Bags", Daniel J. DiBiasi and Fox. J. Herrington, Ser. No. 134,270 filed Dec. 14, 1987, now U.S. Pat. No. 4,842,420, describes a draw tape for a bag where the draw tape is made wider at the center area where it is gripped by hand for förcing any elongation to occur at some other point thereby preventing "roping" at the hand area. "Non-Roping Thermoplastic Draw Tape for Thermoplastic Bags", Daniel J. DiBiasi and David Bryniarski, Ser. No. 157,753 filed Feb. 19, 1988, now abandoned, describes a draw tape for a bag where "roping" in the handle portion of low gauge/high strength thermoplastic draw tapes is reduced by applying a reinforcing patch to the handle portion. The patch may take the form of an additional layer of material such for example as a thin layer of high modulus film or a thick layer of a low modulus film. The two layers are held together by the application of heat and/or adhesive. Suitable thermoplastic material includes films of polypropylene, polystyrene, low density polyethylene and linear lower density polyethylene. The present application describes a method and apparatus for the continuous application of reinforcing patches of predetermine length to thermoplastic draw tape of predetermined length for each thermoplastic draw tape bag to produce non-roping draw tapes for the bags.

SUMMARY OF THE INVENTION

In accordance with one aspect of the invention there is provided a method for the continuous application of reinforcing patches of predetermined length to thermoplastic draw tape of predetermined length for each thermoplastic draw tape bag to produce non-roping draw tape for the bags. The method comprises the step of unwinding draw tape from a supply roll at a predetermined speed and passing the draw tape over a heated drum at a sealing station. The method further comprise the step of unwinding reinforcing patch material from a supply roll at a predetermined tape speed slower than the draw tape speed on the surface of the drum by the direct ratio of the reinforcing patch length to the draw tape length and perforation the reinforcing tape, once per bag, at predetermined locations corresponding to the predetermined length of the reinforcing patches, the distance between perforations determining the patch length. The method further comprises directing the perforated reinforcing tape against the peripheral surface of the drum prior to the point where the draw tape comes in contact with the drum and applying a vacuum through the surface of the drum to the perforated reinforcing tape to hold the reinforcing tap in contact with the surface of the drum at a vacuum station, the peripheral surface of the drum traveling at a faster speed than the speed of the reinforcing tape which slips on the peripheral surface of the drum and continues to move at the unwind speed. The method further comprises the step of mechanically forcing the perforated reinforcing tape against the surface of the drum at a point on the vacuum station for rotation therewith at draw tape speed to cause the reinforcing tape to stretch and break at the perforations whereby the separated patch continues to rotate with the drum, the upstream portion of the reinforcing tape, due to the vacuum, remaining in contact with the surface of the drum and continuing to slip and feed for the next bag. The method further includes the steps of directing the draw tape over the patches on the peripheral surface of the drum between the vacuum station and the heat sealing station, the draw tape and the patches thereafter rotating together at the same speed, applying pressure at the heat sealing station against the draw tape to force the draw tape against the reinforcing patches and the reinforcing patches against the heated drum to cause the reinforcing patches to soften and adhere to the draw tape as each reinforcing patch passes the heat sealing station, and thereafter lowering the temperature of the reinforcing patch below the softening point and directing the draw tape with the heat sealed reinforcing patches away from the heat sealing station for subsequent insertion of the reinforced draw tape into the hems of a thermoplastic bag.

In accordance with a further aspect of the invention there is provided apparatus for the continuous application of reinforcing patches of predetermined length to thermoplastic draw tape of predetermined length to produce non-roping draw tape for thermoplastic draw tape bags. The apparatus comprises a cylindrical drum supported for rotation at a predetermined speed at a heat sealing station in the bag making system, the cylindrical drum having a plurality of chambers extending around the circumference thereof, the cylindrical peripheral surface of the drum being heated and having perforations therein. The apparatus further includes a vacuum manifold communicating with a fractional number of the chambers to supply a vacuum to the perforations in the peripheral surface at a vacuum station. The apparatus further includes means for supplying thermoplastic draw tape from a supply roll to the cylindrical surface of the drum at the heat sealing station for rotation therewith at the predetermined speed. The apparatus further includes means for supplying reinforcing patch material from a supply roll and nip roll means for unwinding the reinforcing tape from the supply roll at a predetermined tape speed slower than the draw tape speed on the surface of the drum by the direct ratio of the reinforcing patch length to the draw tape length. Means is positioned between the supply roll of reinforcing tape and the nip roll means for perforating the reinforcing tape, once per bag, at predetermined locations corresponding to the predetermined length of the reinforcing patches. The apparatus further includes separator nip roll means at the vacuum station for forcing the perforated reinforcing tape against the peripheral surface of the drum for rotation therewith at draw tape speed to separate a patch from the reinforcing tape at the perforations. Means is provided for directing the draw tape over the patches on the peripheral surface of the drum between the vacuum station and the heat sealing station. The apparatus further includes compression applying means at the heat sealing station for applying pressure against the draw tape to force the draw tape against the reinforcing patches and the reinforcing patches against the heated drum to cause the reinforcing patches to soften and adhere to the draw tape as each reinforcing patch passes the heat sealing station, and means for lowering the temperature of the reinforcing patch below the softening point and directing the draw tape with heat sealed reinforcing patches away from the heat sealing station for subsequent insertion of the reinforcing draw tape into the hems of a thermoplastic bag.

In accordance with another aspect of the invention there is provided a method for the continuous application of reinforcing patches of predetermined length to thermoplastic draw tape of predetermined length for each thermoplastic draw tape bag to produce non-roping draw tape for the bags. The method comprises the steps of unwinding draw tape from a supply roll at a predetermined speed and passing the draw tape over a drum adjacent a sealing station. The method further comprises unwinding reinforcing patch material from a supply roll at a predetermined speed slower than the draw tape speed on the surface of the drum by the direct ratio of the reinforcing patch length to the draw tape length and perforating the reinforcing patch material, once per bag, at predetermined locations corresponding to the predetermined length of the reinforcing patches, the distance between perforations determining the patch length. The method further comprises directing the perforated reinforcing patch material against the peripheral surface of the drum prior to the point where the draw tape comes in contact with the drum and applying a vacuum through the surface of the drum to the perforated reinforcing patch material to hold the reinforcing patch material in contact with the surface of the drum at a vacuum station spaced from the sealing station, the peripheral surface of the drum traveling at a faster speed than the speed of the reinforcing patch material which slips on the peripheral surface of the drum and continues to move at the unwind speed. The method further comprises the step of forcing the perforated reinforcing patch material against the surface of the drum at the vacuum station for location therewith at draw tape speed to cause the reinforcing patch material to stretch and break at the perforations whereby the separated patch continues to rotate with the drum, the upstream portion of the reinforcing patch material, due to the vacuum, remaining in contact with the surface of the drum and continuing to slip and feed for the next bag. The method further includes the step of applying a coating of adhesive to the patch material on the peripheral surface of the drum and directing the draw tape over the adhesive coated patches on the peripheral surface of the drum between the vacuum station and the sealing station, the draw tape and the patches thereafter rotating together at the same speed, applying pressure at the sealing station against the draw tape to force the draw tape against the adhesive coated reinforcing patches and the reinforcing patches against the drum to cause the reinforcing patches to adhere to the draw tape as each reinforcing patch passes the sealing station, and thereafter directing the draw tape with the sealed reinforcing patches away from the sealing station for subsequent assembly of the reinforced draw tape with the thermoplastic bag.

In accordance with a further aspect of the invention there is provided apparatus for the continuous application of reinforcing patches of predetermined length to thermoplastic draw tape of predetermined length to produce non-roping draw tape for thermoplastic draw tape bags. The apparatus comprises a cylindrical drum supported for rotation at predetermined speed adjacent a sealing station in the system, the cylindrical drum having a plurality of chambers extending around the circumference thereof, the cylindrical peripheral surface of the drum having perforations therein. The apparatus further includes a vacuum manifold communicating with a fractional number of the chambers to supply vacuum to the perforations in the peripheral surface at a vacuum station spaced from the sealing station in the system, the apparatus further includes means for supplying thermoplastic draw tape from a supply roll to the cylindrical surface of the drum at the sealing station for rotation therewith at the predetermined speed. The apparatus further includes means for supplying reinforcing patch material from a supplying roll and nip roll means for unwinding the reinforcing patch material from the supply roll at a predetermined speed slower than the draw tape speed on the surface of the drum by the direct ratio of the reinforcing patch length to the draw tape length. Means is positioned between the supply roll of reinforcing patch material and nip roll means for perforating the reinforcing patch material, once per bag, at predetermined locations corresponding to the predetermined length of the reinforcing patches. The apparatus further includes separator nip roll means at the vacuum station for forcing the perforated reinforcing patch material against the peripheral surface of the drum for rotation therewith at the draw tape speed to separate a patch from the roll of reinforcing patch material at the perforations. Means is provided for applying an adhesive coating to the patch material on the peripheral surface of the drum and means is provided for directing the draw tape over the adhesive coated patches on the peripheral surface of the drum between the vacuum station and the sealing station. The apparatus further includes compression applying means at the sealing station for applying pressure against the draw tape to force the draw tape against the adhesive coated reinforcing patches and the reinforcing patches against the drum to cause the reinforcing patches to adhere to the draw tape as each reinforcing patch passes the sealing station and means is provided for directing the draw tape with sealed reinforcing patches away from the sealing station for subsequent assembly of the reinforced draw tape with a thermoplastic bag. In accordance with a further aspect of the invention the apparatus includes means for heating the peripheral surface of the drum for setting the adhesive coating on the patches.

For a more detailed disclosure of the invention and for further objects and advantages thereof, reference is to be had to the following description taken in conjunction with the accompanying drawings.

BRIEF DESCRIPTION OF THE DRAWING

The aforesaid objects and aspects of the invention are better understood with reference to the following description and accompanying drawings in which:

FIG. 1a is a fractional plan view taken along lines 1a—1a, in FIG. 1;

DESCRIPTION OF THE PREFERRED EMBODIMENT

Figure 1:
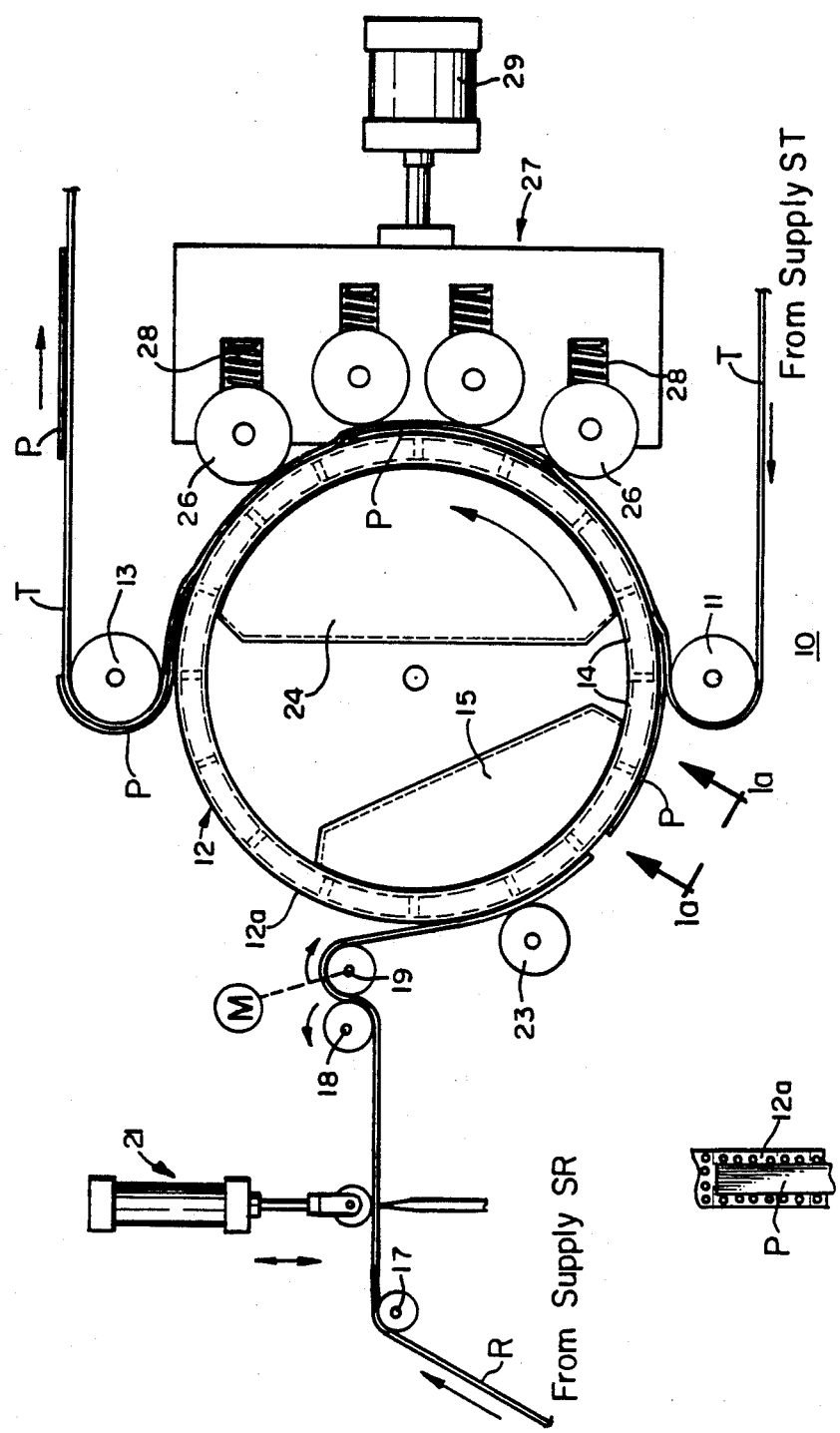
FIG. 1 illustrates diagrammatically a method and apparatus for making non-roping draw tape for thermoplastic bags in accordance with the present invention.
Figure 2:
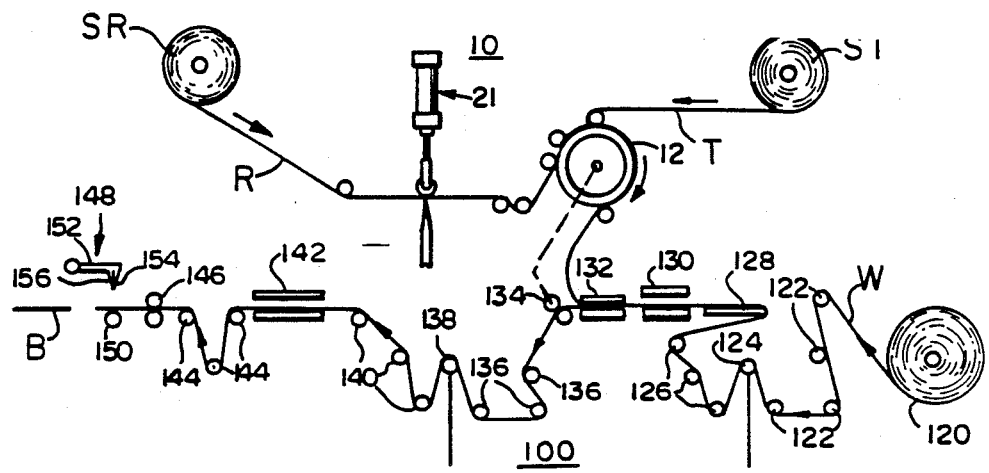
FIG. 2 illustrates diagrammatically a draw tape, thermoplastic film bag manufacturing line incorporating the apparatus of FIG. 1.

Referring to the apparatus 10 illustrated in FIG. 1, a continuous draw tape T is unwound from a large supply roll ST, FIG. 2, and passes around a heated idler roll 11 where it is held against the periphery of a heated rotatable drum 12 driven in synchronism with the web W, FIG. 2. The tape T passes around the drum 12 to another idler roll 13 at the other side after which it passes to a draw tape inserter 132, FIG. 2, for inserting the draw tape into the hem of a draw tape bag B, such for example, as shown in the aforesaid U.S. Pat. No. 4,597,750, as hereinafter described. The peripheral surface 12a of the drum 12 is provided with a plurality of perforations, FIG. 1a, which connect with the plurality of chambers 14 arranged around the circumference of the drum 12. The inner surfaces of the chambers 14 are open so that the chambers 14 can communicate successively with a stationary vacuum manifold 15 at a vacuum station. It will be noted that the vacuum manifold 15 cooperates with only a predetermined number of the chambers 14 at any given time, the purpose of which will now be described.

A reinforcing tape R from a large supply roll SR (FIG. 2) passes over an idler roll 17, FIG. 1, and is unwound by a set of driven nip rolls 18 and 19 and directed against the peripheral surface 12a of the drum 12. One of the nip rolls, for example roll 19, is driven from a variable speed D.C. motor M as hereinafter described. It will be noted that the reinforcing tape R passes from the unwind nips 18, 19 directly onto the surface 12a of heated drum 12 prior to the point where the draw tape T comes in contact with the drum 12. The speed of the nip rolls 18, 19 is adjusted by motor M relative to the speed of the drum 12 so that the speed of the reinforcing tape R is slower than the speed of the draw tape T by the direct ratio of the predetermined length of the reinforcing tape patch P to the predetermined length of the draw tape. A perforator 21 is positioned between the idler 17 and the nip roll 18 and perforates the reinforcing tape R, once per bag, as determined by a timing pulse generated in the bag making system 100, FIG. 2. The distance between perforations determines the length of patch P. By way of example, if the draw tape is to be 30" in length for a 30" wide bag and the patch P is to be 8" in length, the nip rolls 18 and 19 will be driven so as to unwind the reinforcing tape R at a speed of 8/30 times the tape speed T on drum 12.

When the reinforcing tape R leaves the nip roll 19 it moves against the surface 12a of the drum 12 and is held in contact therewith by the vacuum in the adjacent compartments 14 in the drum 12 which are supplied by the vacuum manifold 15 at the vacuum station. Since the drum 12 is traveling at a faster speed, the reinforcing tape R continues to slip on the drum surface 12a and move at the unwind speed of the nip rolls, 18, 19. The reinforcing tape R passes under a separator nip roll 23 which mechanically forces the reinforcing tape R tightly against the surface 12a of the drum 12 and causes the tape R to then move at drum speed. Because of this action, the reinforcing tape R begins to stretch. However, at this point the tape R breaks at the perforations created by the perforator 21. The perforated part or patch P is separated and continues to rotate with the drum 12. The upstream portion of the reinforcing tape R, because of the vacuum in the adjacent chambers 14 supplied by the manifold 15, remains in contact with the surface 12a of the drum 12 but continues to slip and feed for the next bag. The separated patch P of reinforcing tape then rotates under the draw tape web T and then both the patch P and the tape T rotate together under the compression rolls 26 of the pressure applying device 27 at the heat sealing station. The compression rolls 2 are held against the draw tape T by the compression springs 28 and the pressure applying device 27 is adapted to be moved into and out of position with respect to the surface of the drum 12 by an operating cylinder 29. The surface 12a of the drum 12 is heated by any suitable means such as a hot air manifold 24 or electrical resistance heaters in the surface of the drum. The heat from the surface 12a of the drum 12 causes the patch P of reinforcing tape to soften and adhere to the draw tape T. The draw tape T and patch P then pass over the idler roll 13 which is chilled and lowers the temperature of patch P below the softening point. From the chilled roll 13 the tape T with the patch P adhered thereto travel to the tape insertion station and hem sealing station of the bag making machine as described in the aforesaid U.S. Pat. No. 4,597,750 and hereinafter in connection with FIG. 2.

Figure 3:
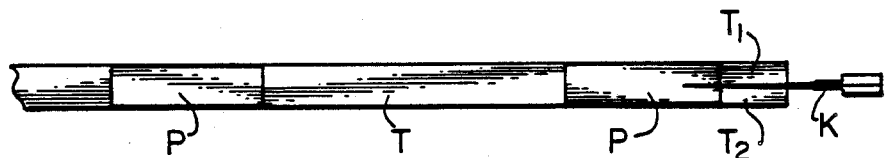
FIG. 3 is a section of the draw tape with spaced reinforcing patches manufactured in accordance with the method and apparatus illustrated in FIG. 1.

Referring to FIG. 2 there is illustrated a bag manufacturing line 100 for the manufacture of thermoplastic film draw tape bags. This line is similar to that disclosed in the aforesaid U.S. Pat. Nos. 4,597,750 and 4,624,654—and incorporated by reference herein. Briefly, a web W of thermoplastic film is drawn by means of a pair of pinch rollers 134 continuously and uninterruptedly from a roll 120 past fixed idler rollers 122, over a dancer roller 124 controlling a brake associated with the roll 120 past additional fixed idler rollers 126, over a hem forming board 128, through an intermittently reciprocating punch 130 and a draw tape strip inserting device 132. The draw tape strip inserting device 132 may be of the type disclosed in U.S. Pat. No. 4,597,750 which includes a knife blade K, FIG. 3, for splitting the wide tape T longitudinally into two narrow draw tapes $T_1$ and $T_2$ to be used in the draw tape bags. The hem forming apparatus 128 may be of the type disclosed in U.S. Pat. No. 4,617,008. The web W as it is fed from the roll 120 consists of a continuous sheet of thermoplastic film medially folded so as to provide a longitudinal fold edge and a pair of superposed panels with longitudinal side edges. When the web W moves past the hem former 128, the side edges are folded in to form hems for receiving the draw tapes. When the web moves past the reciprocating punch 130 holes are punched in the hems through which the draw tapes may be pulled. The draw tape T with reinforcing patches P is received from the apparatus 10 for making non-roping draw tapes and inserted at the draw tape inserting device 132 where it is split into two tapes $T_1$ and $T_2$ as shown in FIG. 3.

Referring again to FIG. 2, a second pair of nip rollers 146 intermittently advance the web past fixed idler rolls 136 over a dancer roll 138, provided for accumulating the web when the rollers 146 are halted, past additional idler rollers 140 through a hem sealer 142 and over U-wrap rollers 144. The hem sealer 142 forms a longitudinal heat seal between each pair of panel portions to form a sealed tunnel structure or hem containing the draw strips. The nip rollers 146 intermittently advance bag width lengths of the web to a transverse sealer-cutter apparatus 148 which is formed by a roller 150 and reciprocating arm 152. The arm 152 includes a heat seal head 154 containing a knife edge 156. The arm 152 simultaneously transversely seals and cuts the web so as to provide individual draw tape bags B.

Figure 4:
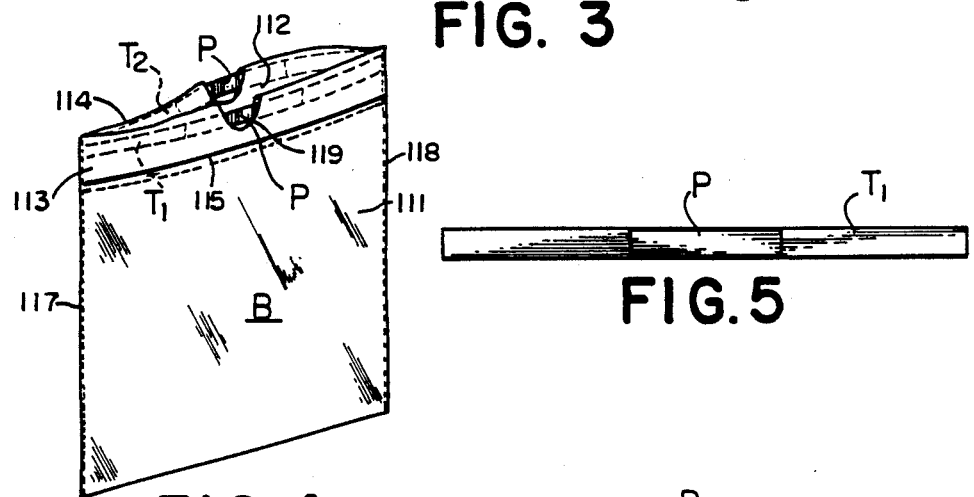
FIG. 4 illustrates a draw tape bag having a draw tape with reinforcing patch manufactured in accordance with the apparatus of FIG. 1.

Referring to FIG. 4 there is shown a draw tape bag B produced by the apparatus of FIGS. 1 and 2. The draw tape bag B is of the type disclosed and claimed in the aforesaid application Ser. No. 157,753. The draw tape bag B includes front and back panels 111 and 112 which are formed from the web W of FIG. 2 which preferably is an extruded tube of polyethylene which is slit along the side to form an open top. The hems 113 and 114 of each panel are folded over adjacent the top by hem former at 128 in FIG. 2 and have a cut-out 119 in the hem of each panel at the middle of the bag produced by the punch 130 in FIG. 2. The reinforced draw tape T is fed from the apparatus 10, FIG. 2, to the tape inserter 132. The reinforced tape T is of double width, as illustrated in FIG. 3 and is adapted to be split in half longitudinally by a tape splitter or knife K which may for example be of the type illustrated in the aforesaid U.S. Pat. No. 4,597,750 and is included in the draw tape inserting device 132, FIG. 2. As shown in FIG. 4 the draw tapes $T_1$ and $T_2$ are inserted in the respective hems 113, 114, which are heat sealed horizontally at 115, 116. The ends of the draw tapes $T_1$ and $T_2$ are secured by the heat seals 117 and 118 at the sides of the panels at the transverse sealer/cutter apparatus 148 shown in FIG. 2. The cut-out 119 in the hem of each panel at the middle of the bag, exposes the reinforced center section with patch P of the draw tapes $T_1$ and $T_2$ so that they can be grasped. When the bag B is loaded, for example with trash or other material, the draw tapes $T_1$ and $T_2$ are grasped at the center section and lifted, thereby closing the mouth of the bag. The draw tapes $T_1$ and $T_2$ can thereafter be tied together to hold the bag closed.

Figure 5:
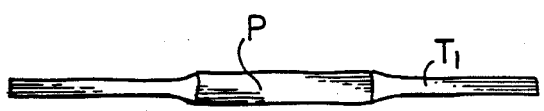
FIG. 5 shows a draw tape for the bag of FIG. 4 manufactured in accordance with the apparatus of FIG. 1.
Figure 6:
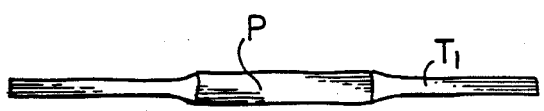
FIG. 6 shows a draw tape of the type shown in FIG. 5 but in stretched condition to illustrate the roping effect.

Referring to FIG. 5 there is illustrated one of the reinforced draw tapes $T_1$, $T_2$ produced in accordance with the present invention. Both of the reinforced draw tapes $T_1$ and $T_2$ are the same and thus only one $T_1$ will now be described. It will be noted in FIG. 5 that the draw tape $T_1$ has a uniform width throughout its length and the length corresponds to the width of the bag B in FIG. 4. At the center of the draw tape $T_1$ there is a reinforcing patch P. The reinforcing patch P has been heat sealed to the draw tape $T_1$ as previously described. The length of the patch P is selected so as to provide a comfortable handle when the bag is drawn closed and is lifted by the handle or draw tape. In the example given above where the width of the draw tape bag is 30" the draw tape will also be 30" in length and the patch will be in the order of 8" in length. The patch P may be of various thermoplastic materials which are adapted to soften when heated and thus enable them to adhere to the draw tape $T_1$. It is preferable that the reinforcing path P be made from a different material than the draw tape proper such that its melting point is lower and its adhesive properties are enhanced. The patch may be a thin layer of high modulus film or a thick layer of a low modulus film. The two layers are held together by the application of heat. Suitable thermoplastic materials include films of polypropylene, polystyrene, low density polyethylene, linear low density polyethylene and ethylene vinyl acetate. By using a reinforcing patch at the handle area of the draw tape "roping" in the handle portion of low gauge/ high strength thermoplastic draw tapes may be reduced. FIG. 6 illustrates the manner in which the roping in the draw tape occurs on either side of the reinforcing patch P.

Figures 7, 7A:
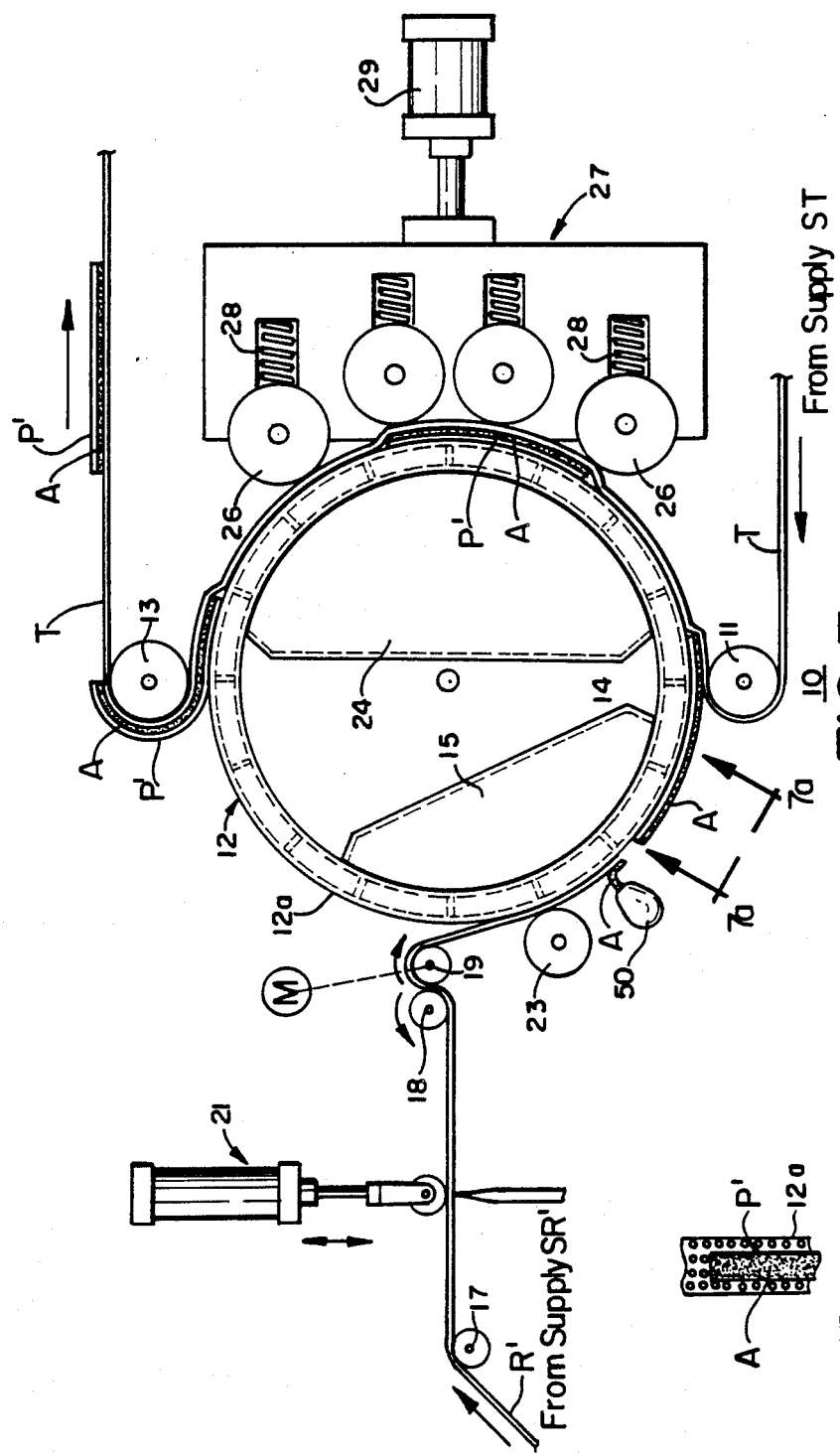
FIG. 7 illustrates diagrammatically a method and apparatus for making non-roping draw tape for thermoplastic bags similar to FIG. 1 but utilizing the application of adhesive to the patch material in accordance with a modification of the present invention.
FIG. 7a is a fractional plan view taken along the line 7a—7a, in FIG. 7.

Referring to FIG. 7 there is illustrated diagrammatically a method and apparatus for making non-roping draw tape for thermoplastic bags similar to that illustrated in FIG. 1 but utilizing the application of adhesive to the reinforcing patches to cause them to adhere to the draw tape. The corresponding parts in FIG. 7 are identified with the same reference characters as those used in FIG. 1. In the system illustrated in FIG. 7 the reinforcing tape need not be of the various thermoplastic materials which are adapted to soften when heated and thus enable them to adhere to the draw tape since an additional adhesive material or coating is to be utilized. In FIG. 7 the reinforcing tape may be of any suitable material to which an adhesive coating can be applied to cause it to adhere to the draw tape by the application of pressure. In FIGS. 7 and 7a the reinforcing tape has been identified as R' and the patches as P'. As may be seen in FIG. 7 after the reinforcing tape R' passes under the separator nip roll 23 which mechanically forces the reinforcing tape R' tightly against the surface 12a of the drum 12, it causes the tape R' to then move at drum speed. Once the tape R' is on the surface 12a of the drum 12 an adhesive A is applied to the outer surface of the tape R' by means of a suitable adhesive applicator illustrated at 50 in FIG. 7. Because the end of the tape R' to which the adhesive A is being applied is moving at drum speed, the reinforcing tape R' begins to stretch and breaks at the perforations created by the perforator 21. The perforated part or patch P' is separated and continues to rotate with the drum 12, FIGS. 7 and 7a. The upstream portion of the reinforcing tape R' because of the vacuum in the adjacent chambers 14 supplied by the manifold 15, remains in contact with the surface 12a of the drum 12 but continues to slip and feed for the next bag. The separated patch P' of the reinforcing tape after being coated with adhesive A then rotates under the draw tape web T and then both the patch P' and the tape T rotate together under the compression rolls 26 of the pressure applying device 27 at the sealing station. The compression rolls 26 are held against the draw tape T by the compression springs 28 and cause the draw tape T and the patch P' to be sealed together. The pressure applying device 27 is adapted to be moved into and out of position with respect to the surface of the drum 12 by the operating cylinder 29 as previously described in connection with FIG. 1. The surface 12a of the drum 12 may be heated if desired depending upon the type of adhesive coating applied to the patch P'. If the adhesive is of the type where pressure alone is sufficient to cause the patch P' to adhere to the draw tape T then no heating is required. However, if the adhesive is of the type that requires heat for setting or drying the adhesive material then the heat may be supplied by the hot air manifold 24. The draw tape T with the patch P' adhered thereto then pass over the idler roll 13 and thereafter travel to the tape insertion station and hem sealing station of the bag making machine as described in the aforesaid U.S. Pat. No. 4,597,750 and previously described in connection with FIG. 2. The patch P' on the tape T will appear in similar fashion to the patch P illustrated in FIGS. 3–6. The entire surface of the patch P' need not be coated with adhesive and the term "coating" as used herein includes a partial coating.

What is claimed is:

1. In a system for the manufacture of thermoplastic draw tape bags, apparatus for the continuous application of reinforcing patches of predetermined length to thermoplastic draw tape of predetermined length to produce non-roping draw tape for the bags comprising:
    (a) a cylindrical drum supported for rotation at a predetermined speed adjacent a sealing station in the system, said cylindrical drum having a plurality of chambers extending around the circumference thereof, the cylindrical peripheral surface of said drum having perforations therein;
    (b) a vacuum manifold communicating with a fractional number of said chambers to supply a vacuum to the perforations in said peripheral surface at a vacuum station spaced from the sealing station in the system,
    (c) means for supplying thermoplastic draw tape from a supply roll to the cylindrical surface of said drum at the sealing station for rotation therewith at the predetermined speed;
    (d) means for supplying reinforcing patch material from a supply roll;
    (e) nip roll means for unwinding the reinforcing patch material from the supply roll at a predetermined speed slower than the draw tape speed on the surface of said drum by the direct ratio of the reinforcing patch length to the draw tape length;
    (f) means positioned between the supply roll of reinforcing patch material and said nip roll means for perforating the reinforcing patch material, once per bag, at predetermined locations corresponding to the predetermined length of the reinforcing patches;
    (g) separator nip roll means at the vacuum station for forcing the perforated reinforcing patch material against the peripheral surface of said drum for rotation therewith at draw tape speed to separate a patch from the roll of reinforcing patch material at the perforations;
    (h) means for applying an adhesive coating to the patch material on the peripheral surface of said drum;
    (i) means for directing the draw tape over the adhesive coated patches on the peripheral surface of said drum between the vacuum station and the sealing station;

(j) compression applying means at the sealing station for applying pressure against the draw tape to force the draw tape against the adhesive coated reinforcing patches and the reinforcing patches against the drum to cause the reinforcing patches to adhere to the draw tape as each reinforcing patch passes the sealing station; and (k) means for directing the draw tape with sealed reinforcing patches away from the sealing station for subsequent assembly of the reinforced draw tape with a thermoplastic bag.

2. Apparatus according to claim 1 including means for heating the peripheral surface of said drum for setting the adhesive coating on the patches.

3. Apparatus according to claim 1 including a hot air manifold for heating the peripheral surface of said drum at said sealing station for setting the adhesive coating on the patches.

4. Apparatus according to claim 1 including means for rotating said cylindrical drum in mechanical synchronism with the system of the manufacture of the thermoplastic draw tape bags.

5. Apparatus according to claim 1 including variable speed drive means for driving said nip roll means to unwind the roll of reinforcing patch material at a predetermined speed.

6. In a process for manufacturing thermoplastic draw tape bags, the method for the continuous application of reinforcing patches of predetermined length to thermoplastic draw tape of predetermined length per bag to produce non-roping draw tape for the bags comprising the steps of:

unwinding draw tape from a supply roll at a predetermined speed and passing the draw tape over a drum adjacent a sealing station;

unwinding reinforcing patch material from a supply roll at a predetermined speed slower than the draw tape speed on the surface of the drum by the direct ratio of the reinforcing patch length to the draw tape length;

perforating the reinforcing patch material, once per bag, at predetermined locations corresponding to the predetermined length of the reinforcing patches, the distance between perforations determining the patch length;

directing the perforated reinforcing patch material against the peripheral surface of the drum prior to the point where the draw tape comes in contact with the drum;

applying a vacuum through the surface of the drum to the perforated reinforcing patch material to hold the reinforcing patch material in contact with the surface of the drum at a vacuum station spaced from the sealing station, the peripheral surface of the drum traveling at a faster speed than the speed of the reinforcing patch material which slips on the peripheral surface of the drum and continues to move at the unwind speed;

forcing the perforated reinforcing patch material against the surface of the drum at the vacuum station for rotation therewith at draw tape speed to cause the reinforcing patch material to stretch and break at the perforations whereby the separated patch continues to rotate with the drum, the upstream portion of the reinforcing patch material, due to the vacuum, remaining in contact with the surface of the drum and continuing to slip and feed for the next bag;

applying a coating of adhesive to the patch material on the peripheral surface of the drum;

directing the draw tape over the adhesive coated patches on the peripheral surface of the drum between the vacuum station and the sealing station, the draw tape and the patches thereafter rotating together at the same speed;

applying pressure at the sealing station against the draw tape to force the draw tape against the adhesive coated reinforcing patches and the reinforcing patches against the drum to cause the reinforcing patches to adhere to the draw tape as each reinforcing patch passes the sealing station; and thereafter directing the draw tape with the sealed reinforcing patches away from the sealing station for subsequent insertion of the reinforced draw tape with a thermoplastic bag.

* * * * *